US008502805B2

(12) United States Patent
Liang

(10) Patent No.: US 8,502,805 B2
(45) Date of Patent: *Aug. 6, 2013

(54) TOUCH STYLUS FOR ELECTRONIC DEVICE HAVING RETRACTED AND EXTENDED POSITIONS

(75) Inventor: Shi-Xu Liang, Shenzhen (CN)

(73) Assignee: FIH (Hong Kong) Limited, Kowloon (HK)

( * ) Notice: Subject to any disclaimer, the term of this patent is extended or adjusted under 35 U.S.C. 154(b) by 456 days.

This patent is subject to a terminal disclaimer.

(21) Appl. No.: 12/813,607

(22) Filed: Jun. 11, 2010

(65) Prior Publication Data

US 2011/0096039 A1 Apr. 28, 2011

(51) Int. Cl.
G06F 3/033 (2013.01)
(52) U.S. Cl.
USPC .......................... 345/179; 178/19.01
(58) Field of Classification Search
USPC .......................... 345/179; 178/19.01
See application file for complete search history.

(56) References Cited

U.S. PATENT DOCUMENTS

| 5,850,059 | A | * | 12/1998 | Yoshimura | 345/179 |
|---|---|---|---|---|---|
| 6,014,552 | A | * | 1/2000 | Aiken et al. | 345/179 |
| 6,233,770 | B1 | * | 5/2001 | Garcia | 7/165 |
| 6,914,596 | B2 | * | 7/2005 | Liu et al. | 345/179 |
| 7,077,594 | B1 | * | 7/2006 | Annerino et al. | 401/258 |
| 7,374,359 | B1 | * | 5/2008 | Annerino et al. | 345/179 |
| 7,431,528 | B2 | * | 10/2008 | Liu | 345/179 |
| 2003/0067453 | A1 | * | 4/2003 | Liu et al. | 345/179 |
| 2003/0184529 | A1 | * | 10/2003 | Chien et al. | 345/179 |
| 2005/0162412 | A1 | * | 7/2005 | Ronkko et al. | 345/179 |
| 2006/0055686 | A1 | * | 3/2006 | Lee | 345/179 |
| 2007/0024601 | A1 | * | 2/2007 | Liu et al. | 345/179 |
| 2007/0075987 | A1 | * | 4/2007 | Liu | 345/179 |
| 2007/0139398 | A1 | * | 6/2007 | Holman et al. | 345/179 |
| 2008/0170048 | A1 | * | 7/2008 | Hua | 345/179 |
| 2009/0050378 | A1 | * | 2/2009 | Lee | 178/19.01 |
| 2009/0122029 | A1 | * | 5/2009 | Sin | 345/179 |

FOREIGN PATENT DOCUMENTS

KR 10-2008-029710 * 4/2008

* cited by examiner

Primary Examiner — Adam J Snyder
(74) Attorney, Agent, or Firm — Altis Law Group, Inc.

(57) ABSTRACT

A touch stylus includes a stylus tube, a stylus holder, and a retracting mechanism. The stylus tube includes a tip integrally formed on one end thereof. The stylus holder is retractably coupled to the stylus tube by the retracting mechanism so the stylus holder can be extended out of the stylus tube to improve the convenience of use of the touch stylus or retracted to improve the portability of the touch stylus. The retracting mechanism includes a guiding track defined in the stylus holder and a fixing pin retractably engaged with the guiding track and fixed to the stylus tube so the stylus holder is retractably coupled to the stylus tube.

17 Claims, 5 Drawing Sheets

TOUCH STYLUS FOR ELECTRONIC DEVICE HAVING RETRACTED AND EXTENDED POSITIONS

BACKGROUND

1. Technical Field

This exemplary disclosure generally relates to touch styluses for electronic devices.

2. Description of Related Art

With the development of wireless communication and information processing technologies, portable electronic devices, such as mobile phones and personal digital assistants (PDAs), are now in widespread use. Touch styluses are usually provided and removably secured within the outside wall of the portable electronic device for inputting information. The touch styluses need to be small or thin to meet the compactness requirements of the portable electronic device. However, they can be uncomfortable to use.

Therefore, there is room for improvement within the art

BRIEF DESCRIPTION OF THE DRAWINGS

Many aspects of the exemplary touch stylus can be better understood with reference to the following drawings. The components in the various drawings are not necessarily drawn to scale, the emphasis instead being placed upon clearly illustrating the principles of the exemplary touch stylus. Moreover, in the drawings, like reference numerals designate corresponding parts throughout the diagrams.

DETAILED DESCRIPTION

The touch stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, and portable media players (such as an MP3 or DVD player) that have wireless communication capability. Accordingly, any reference herein to the mobile telephone should also be considered to apply equally to other portable wireless electronic devices.

Figure 1:
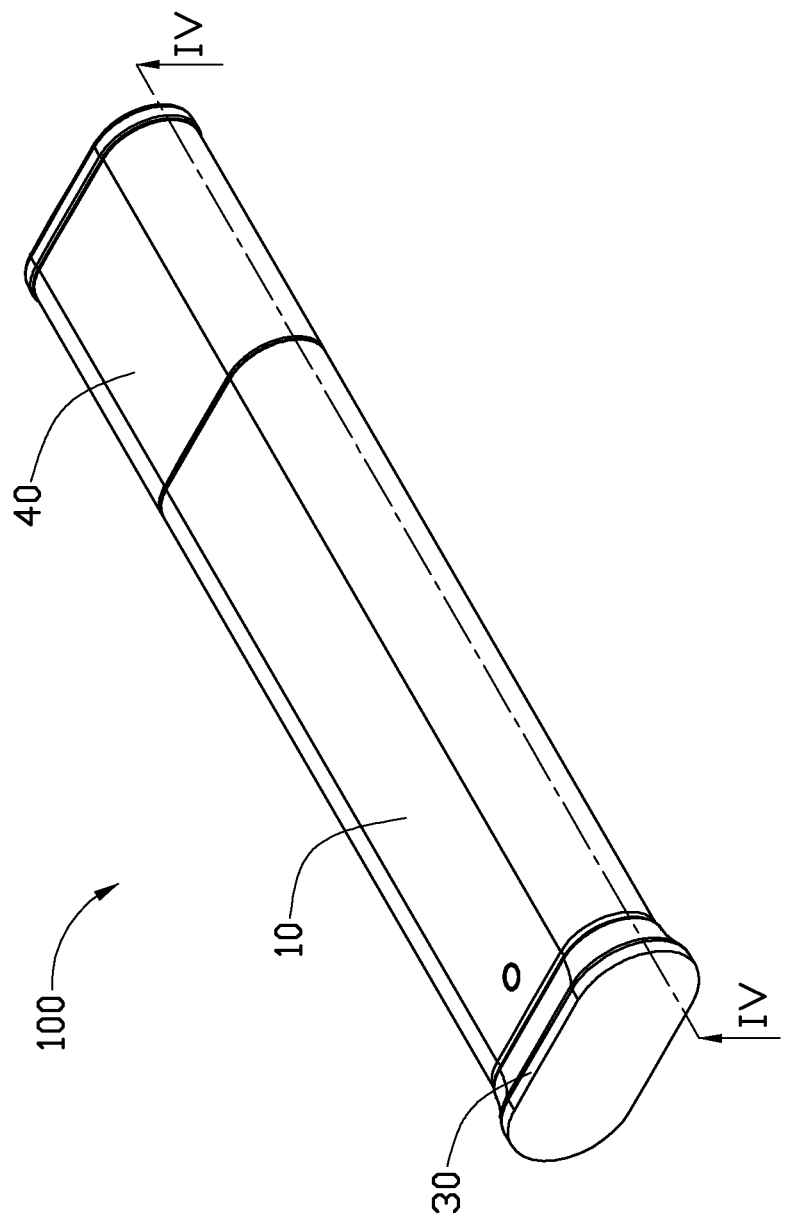
FIG. 1 shows a perspective view of the touch stylus, in accordance with an exemplary embodiment.
Figure 2:
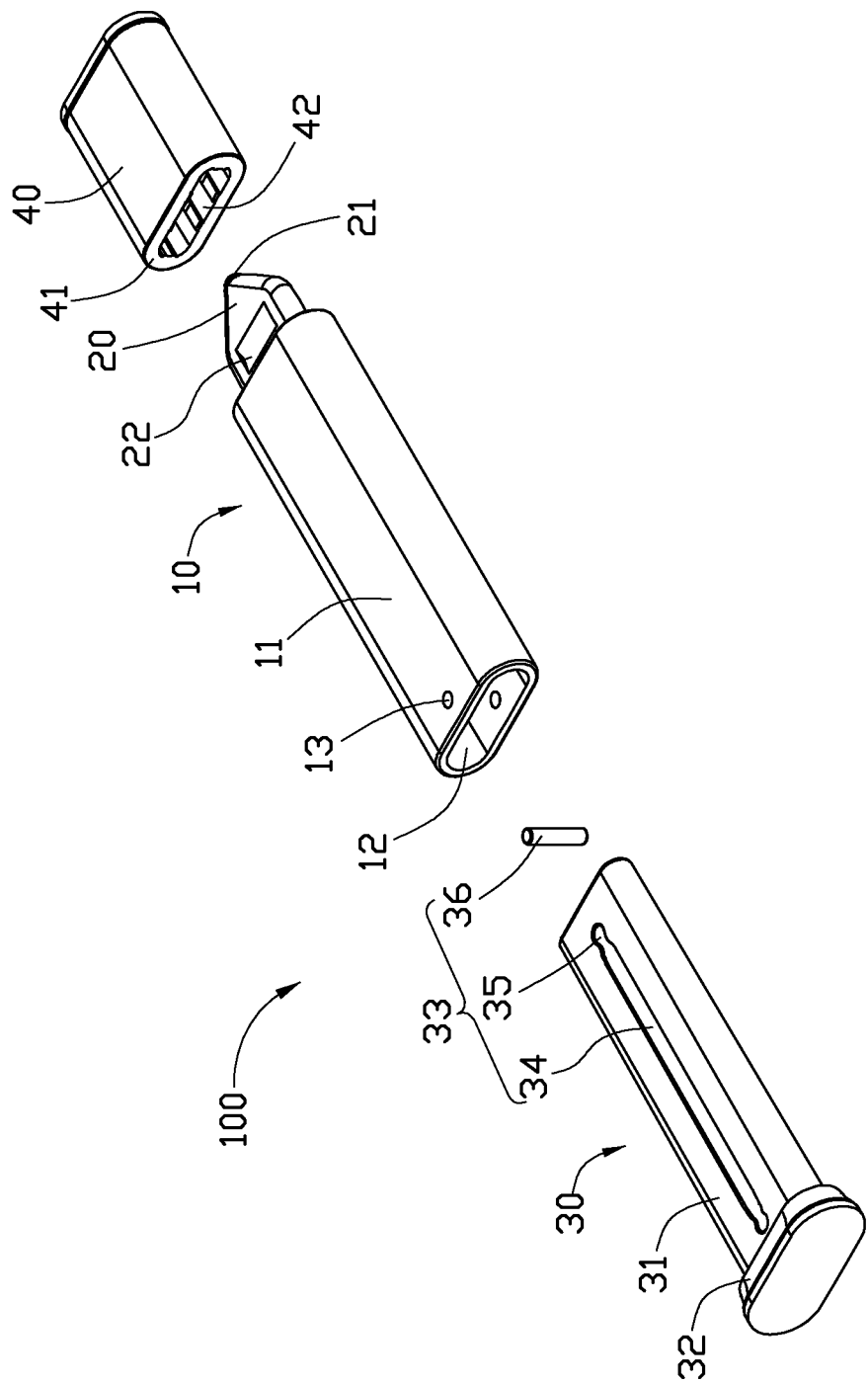
FIG. 2 shows an exploded perspective view of the touch stylus shown in FIG. 1, in accordance with an exemplary embodiment.
Figure 4:
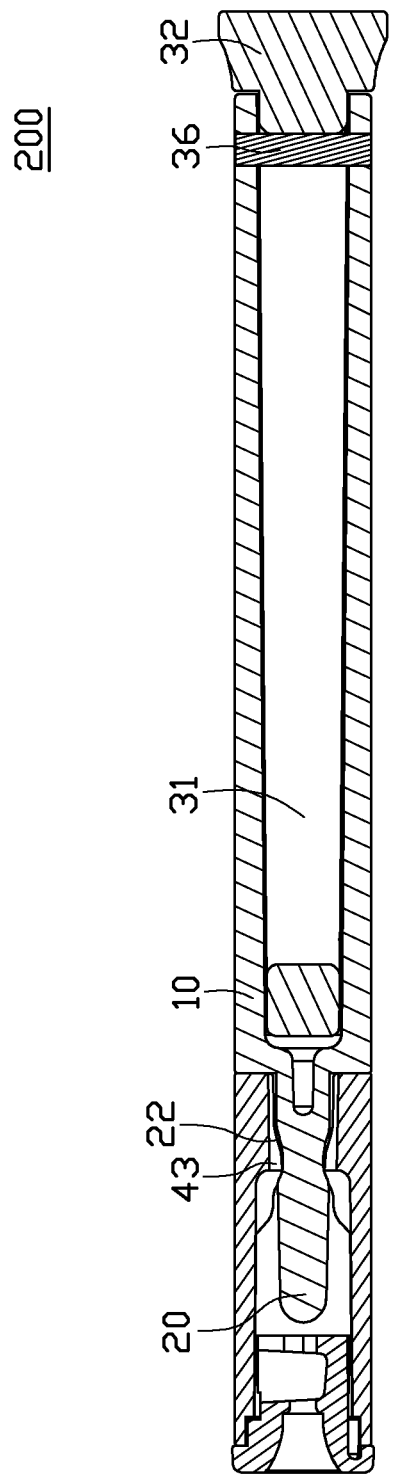
FIG. 4 shows a cross-sectional view taken along line IV-IV of FIG. 1, wherein, the touch stylus is viewed in a retracted or a closed state.
Figure 5:
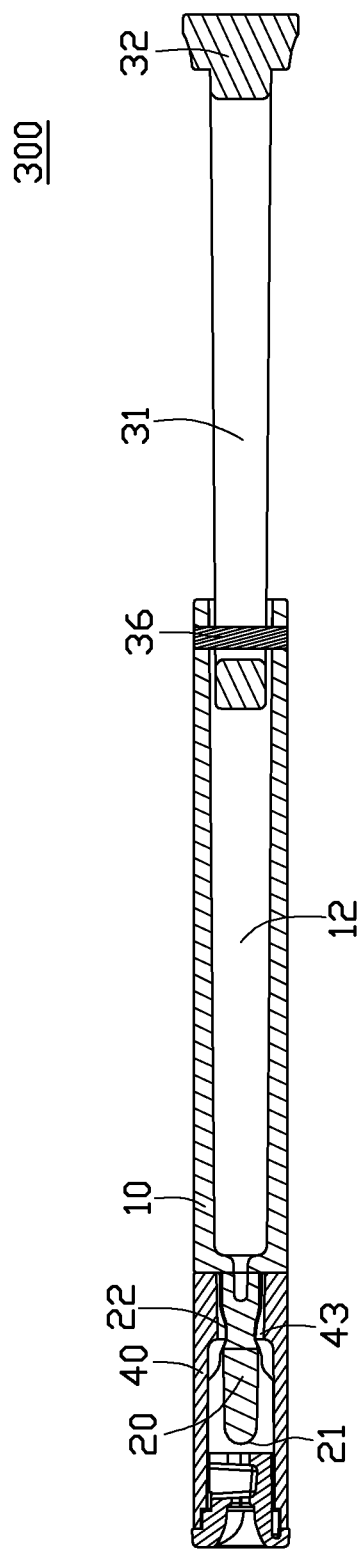
FIG. 5 is similar to FIG. 4, showing another cross-sectional view of the touch stylus, wherein, the touch stylus is in an extended state.

FIGS. 1 and 2 show the touch stylus 100, includes a stylus tube 10, a tip 20 integrally connected to an end of the stylus tube 10, a stylus holder 30 and a cap 40. The stylus holder 30 is retractably and slidably coupled to the stylus tube 10 by a retracting mechanism 33. FIG. 4 shows a retracted configuration 200 where the stylus holder 30 is retracted and accommodated within the stylus tube 10 to improve the portability of the touch stylus 100. FIG. 5 shows an extended configuration 300 where the stylus holder 30 is extended out of the stylus tube 10 to improve the convenience of use of the touch stylus 100.

The stylus tube 10 is tubular and can be constructed of a lightweight metal such as stainless steel, aluminum alloy, or plastic. The stylus tube 10 is hollow and has an accommodating space 12 defined lengthwise from one end to the tip 20. The stylus tube 10 may have a substantially oval cross-section and include two opposite longitudinal side walls 11 and two substantially aligned positioning holes 13 substantially adjacent to one end of the stylus tube 10 at the opposite end from the tip 20.

The tip 20 is a substantially triangular or conical body configured to be fixed to an end of the stylus tube 10 opposite to the positioning holes 13. The tip 20 includes a touch point 21 for contacting a touch screen display of the electronic device. The tip 20 defines two aligned latching slots 22 respectively in the upper wall and the bottom wall.

Figure 3:
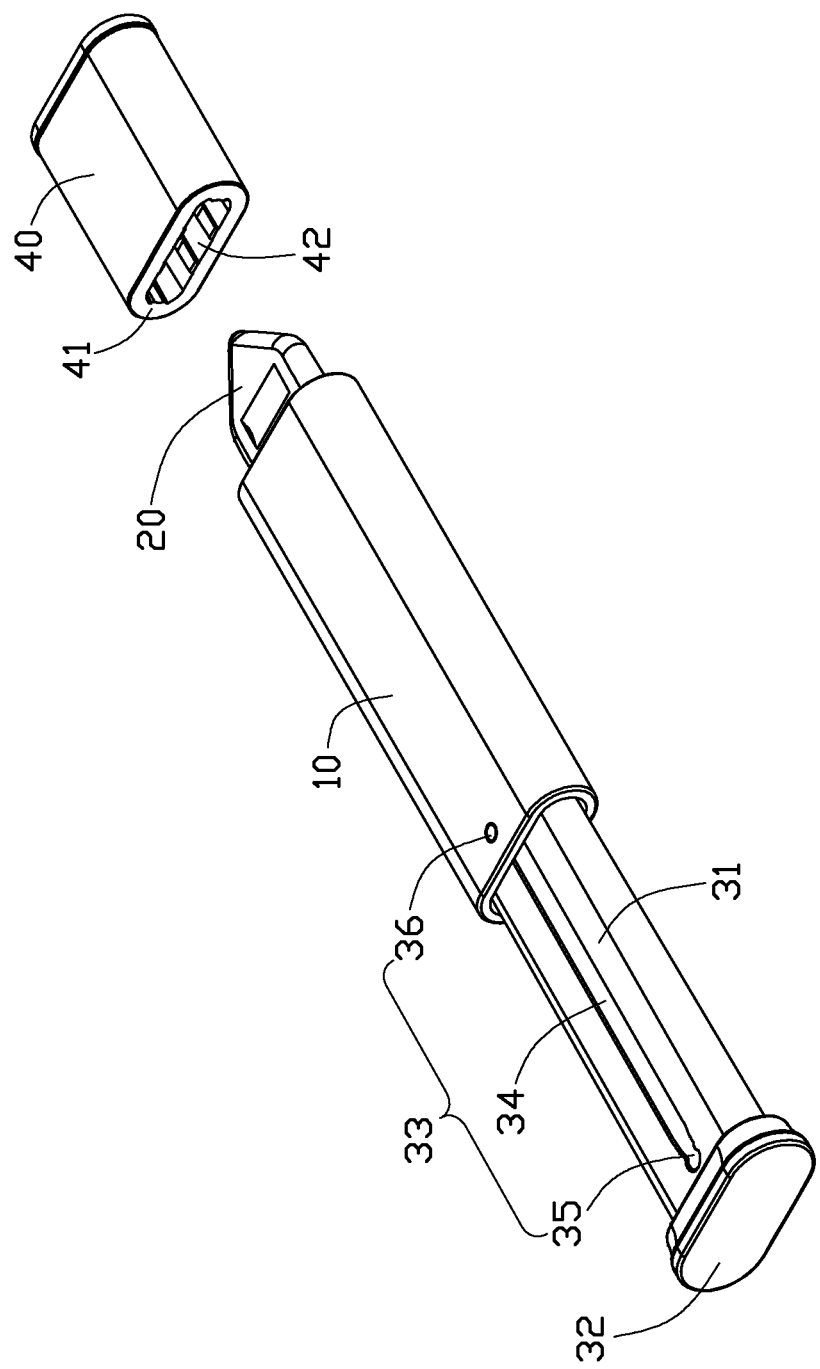
FIG. 3 shows another perspective view of the touch stylus, wherein, the touch stylus is viewed in an extended state.

Also referring to FIG. 3, the stylus holder 30 includes a main body 31 and an ejecting handle 32 integrally formed at one distal end of the main body 31. The main body 31, and may be retracted and accommodated within the accommodating space 12 of the stylus tube 10. The ejecting handle 32 is made of elastic material such as rubber and has substantially the same shape as, but is slightly smaller than the opening of the accommodating space 12 of the stylus tube 10. The ejecting handle 32 can be tightly inserted into and can be latched to the opening end of the accommodating space 12 relative to the stylus tube 10 from the extended configuration 300 to the retracted configuration 200.

Referring to FIGS. 2 and 3, the retracting mechanism 33 is provided for retractably and slidably coupling the stylus holder 30 to the stylus tube 10. The retracting mechanism 33 includes a guiding track 34, two stopping holes 35, and a fixing pin 36 engaging with the guiding track 34. The guiding track 34 is defined longitudinally through the main body 31 of the stylus holder 30. The width of the guiding track 34 is slightly shorter than the diameter of the fixing pin 36 so the fixing pin 36 can be assembled within and slide along the guiding track 34.

The two stopping holes 35 are defined at opposite ends of the guiding track 34 and communicate with the guiding track 34. The two stopping holes 35 are configured to hold the stylus holder 30 in the retracted configuration 200 or the extended configuration 300. The two stopping holes 35 are dimensioned to tightly fit the fixing pin 36 therein when the stylus holder 30 slides to the retracted configuration 200 (FIG. 4) and/or the extended configuration 300 (FIG. 5). The width of the entrance to the stopping hole 35 is slightly smaller than the diameter of the fixing pin 36 so the fixing pin 36 can not freely slide out of the stopping hole 35 when the fixing pin 36 is inside the stopping hole 35. Thus, the stylus holder 30 can be firmly held in the retracted configuration 200 and the extended configuration 300 by the tight fitting engagement between the two stopping holes 35 and the fixing pin 36.

The cap 40 is detachably covered on the tip 20 end of the stylus tube 10 to protect the tip 20. The cap 40 includes an accommodating cavity 41 and a latching protrusion protruding from an inner surface 42 corresponding to the latching portion of the tip 20. The latching protrusion includes two aligned latching hooks 43 disposed at two inner sides of the inner surface 42 of the cap 40 for being latched in the two latching slots 22 of the tip 20 while the cap 40 is covering the tip 20. Accordingly, the tip 20 can tightly hold the cap 40.

Referring to FIGS. 2, 3 and 5, to assemble the touch stylus 100, the main body 31 of the stylus holder 30 is inserted into accommodating space 12 of the stylus tube 10 to respectively align the two positioning holes 13 of the stylus tube 10 with the guiding track 34 and one of the two stopping holes 35. After that, the fixing pin 36 is correspondingly inserted into and penetrates into one positioning hole 13 of the stylus tube 10, and the corresponding stopping hole 35 or the guiding track 34, and the other positioning hole 13. The two ends of the fixing pin 36 are respectively fixed within the corresponding two positioning holes. The stylus holder 30 is then retractably and is slidably assembled to the stylus tube 10 and accommodated within the accommodating space 12 of the stylus tube 10. The cap 40 is covered on the tip 20 end of the stylus tube 10 to protect the tip 20, the two aligned latching hooks 43 respectively latch into the corresponding two latching slots 22 of the tip 20.

Referring to FIGS. 1, 3 to 5, in use, the ejecting handle 32 of the stylus holder 30 is pulled away from the stylus tube 10 until the fixing pin 36 runs away from the stopping hole 35 adjacent to the ejecting handle 32 toward and locked within the opposite stopping hole 35. The stylus holder 30 is fully extended. The cap 40 is removed from the tip 20 for combatable use of the touch stylus 100.

It is to be understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A touch stylus, comprising:
a stylus tube having a tip connected to an end thereof; and
a stylus holder retractably coupled to the stylus tube by a retracting mechanism so the stylus holder can be extended out of the stylus tube or retracted into the stylus tube;
wherein, the retracting mechanism includes a guiding track defined at the stylus holder, two stopping holes defined at opposite ends of the guiding track and communicating with the guiding track and a fixing pin retractably engaging with the guiding track and the two stopping holes and fixed to the stylus tube so the stylus holder is retractably coupled to the stylus tube; the two stopping holes and the guiding track are aligned along a straight line.

2. The touch stylus as claimed in claim 1, wherein the stylus tube includes two opposite longitudinal side walls, an accommodating space longitudinally defined therein from one end to the tip and two aligned positioning holes adjacent one end of the stylus tube distal from the tip; each end of the fixing pin fixed within one of the two positioning holes respectively.

3. The touch stylus as claimed in claim 2, wherein each stopping hole configured to lock the fixing pin therein for holding the stylus holder in a retracted configuration or an extended configuration.

4. The touch stylus as claimed in claim 3, wherein the stopping holes are dimensioned to tightly fit the fixing pin therein when the stylus holder is slid to the retracted configuration or the extended configuration.

5. The touch stylus as claimed in claim 3, wherein the width of the entrance to the stopping hole is slightly smaller than the diameter of the fixing pin so the fixing pin can not freely slide out of the stopping hole when the fixing pin is fit in the stopping hole.

6. The touch stylus as claimed in claim 1, wherein the stylus holder includes a main body and an ejecting handle integrally formed at one distal end of the main body, the guiding track defined longitudinally through the main body of the stylus holder.

7. The touch stylus as claimed in claim 6, wherein the touch stylus further includes a cap detachably covered on the tip end of the stylus tube to protect the tip.

8. The touch stylus as claimed in claim 7, wherein the tip includes a touch tip and a latching portion defined at an outer surface of the tip; the cap includes an accommodating cavity defined longitudinally therein and a latching protrusion protruding from an inner surface thereof corresponding to and latching with the latching portion of the tip.

9. The touch stylus as claimed in claim 8, wherein the latching porting includes two aligned latching slots defined in the upper wall and the bottom wall of the tip respectively; the latching protrusion includes two aligned latching hooks disposed at two inner sides of the inner surface of the cap for being rested in the two latching slots of the tip while the cap is cover on the head portion.

10. The touch stylus as claimed in claim 6, wherein the ejecting handle is made of elastic material and has the shape slightly smaller than the opening of the accommodating space of the stylus tube, so the ejecting handle can be tightly inserted into and latched to the opening end of the accommodating space.

11. A touch stylus, comprising:
a stylus tube having an accommodating space defined longitudinally therein from one end thereof;
a tip formed on one end thereof opposite to the accommodating space;
a stylus holder slidably assembled to the stylus tube and retractably accommodated within the accommodating space; the stylus holder including a guiding track longitudinally defined therethrough and two stopping holes defined at opposite ends of the guiding track and communicating with the guiding track, the two stopping holes and the guiding track aligning along a straight line; and
a fixing pin positioned in the stylus tube and slidably engaging with the guiding track and the two stopping holes to allow the stylus holder to slide relative to the stylus tube so the stylus holder can be extended out of the stylus tube or retracted into the stylus tube.

12. The touch stylus as claimed in claim 11, wherein the touch stylus further includes a cap detachably covered on the tip end of the stylus tube to protect the tip.

13. The touch stylus as claimed in claim 12, wherein the tip includes a touch tip and a latching portion defined at an outer surface of the tip; the cap includes an accommodating cavity defined longitudinally therein and a latching protrusion protruding from an inner surface thereof corresponding to and latching with the latching portion of the tip.

14. The touch stylus as claimed in claim 11, wherein two aligned positioning holes are defined on the stylus tube, each end of the fixing pin fixed within one of the two positioning holes respectively and then the fixing pin vertically penetrates the stylus tube.

15. The touch stylus as claimed in claim 14, wherein each stopping hole is configured to lock the fixing pin therein for holding the stylus holder in a retracted configuration or an extended configuration.

16. The touch stylus as claimed in claim 15, wherein the stopping holes are dimensioned to tightly fit the fixing pin therein when the stylus holder is slid to the retracted configuration or the extended configuration.

17. The touch stylus as claimed in claim 15, wherein the width of the entrance to the stopping hole is slightly smaller than the diameter of the fixing pin so the fixing pin can not freely slide out of the stopping hole when the fixing pin is fit in the stopping hole.

* * * * *